United States Patent [19]

Curiger et al.

[11] 4,087,700
[45] May 2, 1978

[54] MONITORING APPARATUS FOR A TEXTILE MACHINE

[75] Inventors: Karl Curiger, Pfaffikon; Hermann Gasser, Zurich; Stephan Wüest, Weinfelden, all of Switzerland

[73] Assignee: Luwa AG, Zurich, Switzerland

[21] Appl. No.: 724,772

[22] Filed: Sep. 20, 1976

[30] Foreign Application Priority Data

Sep. 29, 1975 Switzerland .................... 12577/75

[51] Int. Cl.² .............................................. H01H 35/00
[52] U.S. Cl. ...................................... 307/116; 340/259
[58] Field of Search .............................. 307/116, 117; 200/61.13-61.19; 340/259, 213 R; 302/42; 73/160; 328/110, 146, 147, 148, 149

[56] References Cited

U.S. PATENT DOCUMENTS

| | | | |
|---|---|---|---|
| 2,774,061 | 12/1956 | Breuning | 340/259 |
| 3,293,553 | 12/1966 | Brown | 328/110 |
| 3,723,987 | 3/1973 | Barone et al. | 340/239 |

*Primary Examiner*—Robert K. Schaefer
*Assistant Examiner*—Morris Ginsburg
*Attorney, Agent, or Firm*—Werner W. Kleeman

[57] ABSTRACT

A monitoring apparatus for a textile machine comprising a feeler coupled with an evaluation circuit, the feeler possessing two spaced electrodes, each of which delivers an electrode signal when textile material moves therepast. The electrodes are offset in the direction of movement of the textile material and the evaluation circuit comprises a logic circuit responsive to electrode signals having a time displacement corresponding at least approximately to the transit time of the textile material from the one electrode to the other electrode.

19 Claims, 4 Drawing Figures

MONITORING APPARATUS FOR A TEXTILE MACHINE

BACKGROUND OF THE INVENTION

The present invention relates to a new and improved construction of monitoring apparatus for a textile machine, comprising a feeler coupled with an evaluation circuit, the feeler in turn embodying two electrodes arranged in spaced relationship from one another, each of which delivers an electrode signal when the textile material moves therepast.

Such monitoring apparatuses serve to detect irregular operating conditions at textile machines and for automatically triggering a warning signal and/or control operations which eliminate such irregular operation. Under the term "irregular operating condition" or equivalent expressions there is to be understood, for instance, the rupture of, or other irregularity existing at, a yarn, a silver, a slubbing or a fleece, whereas examples of a textile machine with which the invention can be employed are a card, a drafting arrangement, a spinning machine or a loom.

It should be understood that not every signal transmitted by the electrodes is indicative of an irregular operating condition of the machine falling within or without a tolerable range. In order to differentiate which ones of the signals delivered by the electrodes in fact indicate an actual fault or defect, different monitoring apparatuses of the previously mentioned type have already become known to the at which essentially differ from one another by the criteria according to which the evaluation circuit takes into account or does not take into account the signals delivered thereto.

For instance, with the evaluation circuit described in German Pat. No. 1,685,886 the signals delivered by the feeler are analysed with respect to their peak and frequency (repetition) in such a manner that there are only evaluated signals whose amplitude exceeds a minimum value and which are repetitive at a minimum frequency over a longer period of time or are present over a longer period of time. With this state-of-the-art monitoring apparatus which has been found to be satisfactory in practice, the parameters (e.g., minimum peak of the electrode signals, lower boundary frequency, minimum duration of the individual signals, flank shape of the electrode signals) which are to be accommodated to the specific field of application are so numerous that it is not always possible to detect by means of the monitoring apparatus only the significant irregular operating conditions. In other words: with the heretofore known monitoring apparatus an ideal setting or adjustment is hardly possible, so that as a general rule the monitoring apparatus is much too sensitive. Other examples of monitoring apparatuses functioning in this manner have been disclosed in Swiss Pat. No. 540,848.

According to another comparable monitoring apparatus, as disclosed for instance in German Pat. No. 1,139,997, the signals delivered by the feeler are only evaluated with respect to their amplitude in the manner that when and as long as there is present a signal amplitude exceeding a predetermined value there occurs the formation of a corresponding long square-wave pulse which is then differentiated and the resultant differentiated square-wave pulse is employed for triggering a monostable multivibrator possessing sufficiently long return time, which then in turn is employed for controlling an indicator or means for eliminating the irregular operating condition. Also this monitoring apparatus undertakes a selection of the signals which are taken into account only on the basis of the attained amplitudes. Hence, this equipment is not capable of eliminating electrode signals of sufficient amplitude which result for reasons other than the movement of textile material past the electrodes, such as for instance transient, induced electrical voltage peaks in the power supply network or in the field surrounding the electrodes.

In order to overcome such drawback there has been proposed a further construction of monitoring apparatus, which is not part of the state-of-the-art, wherein each of both electrodes, in principle, is coupled with the one input of a differential amplifier, and only the output signal of such differential amplifier is delivered for further processing. This monitoring apparatus is based upon the assumption that textile material moving past the electrodes in any event will not produce the same signal — as concerns duration and amplitude — at both electrodes, whereas the signals induced by outside influences, so-called external or spurious signals, in any case are congruent both with respect to amplitude and also duration. Yet, this assumption is not always valid, particularly if it is realized that, for instance, the capacitance of the individual electrodes with respect to ground cannot be assumed to be constant as a function of time.

SUMMARY OF THE INVENTION

Hence, it is a primary object of the present invention to provide a new and improved construction of monitoring apparatus for a textile machine which is not associated with the aforementioned drawbacks and limitations of the prior art proposals.

Another and more specific object of the present invention aims at the provision of a new and improved construction of monitoring apparatus wherein there can be employed for the selection of the electrode signals a further criterion than that of the signal shape (amplitude and duration), so that there can be positively avoided further processing of external or spurious signals.

Now in order to implement these and still further objects of the invention, which will become more readily apparent as the description proceeds, there is proposed a monitoring apparatus of the previously mentioned type which is manifested by the features that the electrodes are arranged in offset relationship in the direction of movement of the textile material. The evaluation circuit comprises a logic circuit which responds to electrode signals having a time shift or displacement corresponding at least approximately to the transit or travel time of the textile material from the one electrode to the other electrode.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
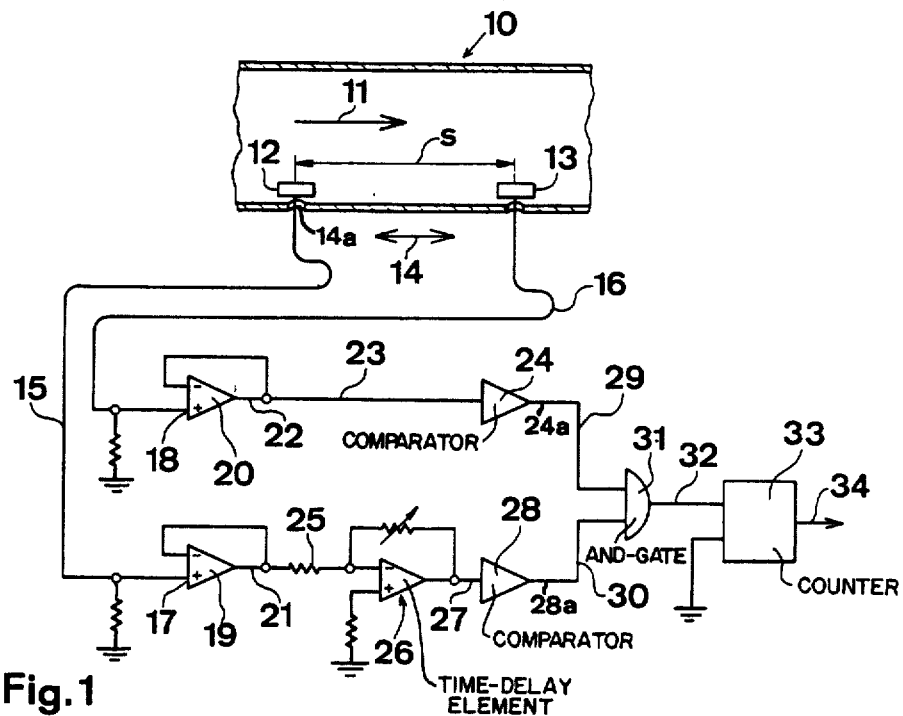
FIG. 1 is a block circuit diagram of a first exemplary embodiment of monitoring apparatus constructed according to the present invention.

Describing now the drawings, in FIG. 1 there will be recognized a channel or duct, for instance an air channel or duct 10 of a not particularly illustrated suction apparatus of a textile machine. In the channel 10 air is moved at practically constant velocity in the direction of the arrow 11. Two electrodes 12 and 13 are arranged in the air channel or duct 10 and held by any suitable and therefore not particularly illustrated means. As to these two electrodes 12 and 13 the electrode 12 — viewed in the direction of movement of the air — constitutes the forward electrode whereas the rear electrode 13 is arranged downstream of the electrode 12 by the distance s. In the illustration both electrodes 12 and 13 have been shown arranged at the same side of the air channel 10. Yet, this is of no criticality since the electrodes 12 and 13 also could be located at oppositely situated sides of such air channel, however always arranged offset in the direction of movement of the air by a given distance. The double-headed arrow 14 signifies that the one electrode, for instance in this case the electrode 12, can be shifted and fixed in position relative to the other electrode 13 by any suitable and therefore only schematically indicated means 14a, such as a slot and fixing element, in order to adjust the distance s as desired.

In the event, textile material, for instance a flock of a broken fleece or bundle of fibers is moved past the electrodes 12 and 13, then the potential appearing at such electrodes momentarily changes due to the change in the dielectric constant of their surroundings, i.e., there appears at the electrodes a detectable electrical voltage signal.

Both the electrode 12 as well as the electrode 13 are each connected via a screened conductor 15 and 16, respectively, with the positive input 17 and 18 of an operational amplifier 19 and 20, respectively. Both of these operational amplifiers 19 and 20 which are preferably similarly constructed, operate as powerless direct-current voltage amplifiers and deliver at their respective outputs 21 and 22 a signal amplified by a number of powers of ten in relation to the signal appearing at the electrodes. Due to the same construction of the operational amplifiers 19 and 20 the rest or quiescent voltage of the electrodes also can be the same. This rest voltage also can be equal to null. The output 22 of the operational amplifier 20 is connected through the agency of a conductor or line 23 with the input of a comparator 24 which, for instance, may be a monostable multivibrator possessing a predetermined return time and, if desired, having an adjustable response voltage, and therefore functioning as a digitizing pulse shaper.

On the other hand, the output 21 of the operational amplifier 19 is connected through the agency of a coupling resistor 25 with the input of a time-delay element 26, for instance in the form of a phase shifter, the output 27 of which is coupled with the input of a comparator 28. The comparator 28 can be constructed in principle the same as the comparator 24. The time-delay adjusted at the time-delay element 26 approximately corresponds to the travel or transit time of the air current for traversing the distance s.

The outputs 24a and 28a of the comparators 24 and 28 respectively, are coupled in turn with the respective inputs 29 and 30 of an AND-gate 31, the output 32 of which is connected in the broadest sense with a counter circuit 33. This counter circuit or counter 33 can contain an integration stage having an output which continuously decreases in the manner of an exponential function, or can be constituted as a peselector counter which is periodically reset to null. In any event, the counter circuit 33 only then delivers a signal at its output 34 when, in a predetermined time duration, the number of signals delivered by the gate 31 exceed the upper tolerance boundary. By means of the signal at the output 34 there are activated indicator means and/or a warning device and/or control functions at the textile machine.

Figure 2:
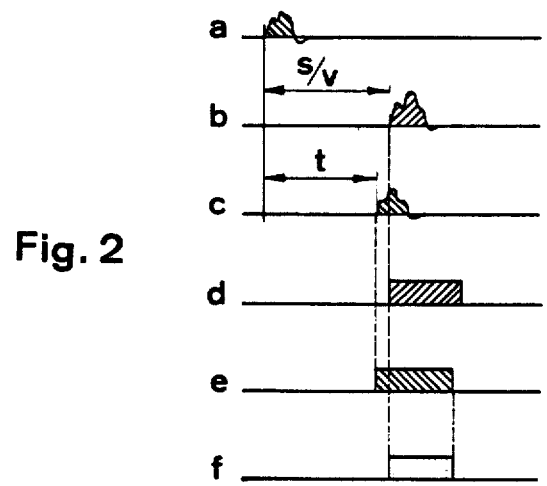
FIG. 2 is a diagram showing as a function of time the signals which appear at different locations of the circuitry of FIG. 1.

The mode of operation of circuitry of FIG. 1 will be explained based upon the illustration of FIG. 2, and it is here to be mentioned that the pulse duration shown in the pulse diagrams of FIG. 2 have been considerably exaggerated for explanatory purposes in order to improve the understanding of the invention.

It is assumed that in the air current a fiber flock is moved with the average velocity $v$ past the electrode 12 and thereafter to the electrode 13. This fiber flock generates at the conductor or line 15 and at the output 21 of the operational amplifier 19 the signal illustrated in line $a$ of FIG. 2. After a period of time, corresponding to $s/v$, the same flock moves past the electrode 13 and at that location and at the output 22 of the operational amplifier 20 produces the signal shown in line $b$ of FIG. 2. This signal is comparable as concerns its duration to the signal shown in line $a$, but however can be different in its amplitude and shape.

The signal appearing at line $a$ is delayed by the time $t$ in the time-delay element 26, i.e., time-shifted, so that at the output 27 of the time-delay element 26 there appears the signal illustrated in line $c$.

The comparator 24 responds to the signal of line $b$ and there appears at its output 24a a logic L-signal of a predetermined duration, i.e. having a square-wave pulse (line $d$) whereas the comparator 28, in response to the signal emanating from the time-delay element 26 (line $c$) produces at its output 28a likewise an L-signal of the same duration (line $e$). At the output 32 of the gate 31 there thus appears a logic L-signal (line $f$) only as long as there is present at the input 29 as well as at the input 30 a signal (lines $d$ and $e$ respectively).

It is here to be remarked that fluctuations in the velocity of the air current, leading to a change in the transit time between the electrode 12 and the electrode 13, i.e., to a deviation from the time-delay $t$ set at the time-delay element 26, can be readily compensated by appropriate selection of the duration of the signals delivered by the comparators 24 and 28. The duration of such signals should, however, in any event be considerably smaller than the transit or travel time of the air current between the electrodes 12 and 13.

If, on the other hand, there is simultaneously generated a signal by transients, i.e., temporary external electrical phenomena appearing at the electrodes 12 and 13, then these signals. due to the time-delay element 26, do not simultaneously arrive at the logic gate 31 which, as a result, does not deliver any signal. In the event that a long flock, for instance a fiber strand which has not yet been warped by the air current and having a length comparable to the distance $s$ moves past the electrodes 12 and 13, then, it will be apparent that in any case a signal will appear at the output 32 of the logic gate 31. The apparatus also will function in a faultless manner if by coincidence a flock simultaneously moves past the electrode 12 and another flock past the electrode 13. This is so because the flock at the electrode 12 will produce a further signal at the electrode 13 after a time corresponding approximately to $s/v$ whereas the flock at the electrode 13 has produced a signal approximately at a time $s/v$ earlier at the electrode 12.

By virtue of the fact that with this monitoring apparatus there is employed a criterion which goes beyond the signal duration and the signal amplitude, namely that of the transit time between two points arranged in offset relationship in the direction of movement, in order to distinguish between signals which are to be evaluated and those which are to be neglected, the apparatus in certain instances can be especially simply realized with the use of an anticoincidence circuit, for instance with an Exclusive-OR-gate, which as is known only then delivers a signal at its output when a signal appears at only one of its inputs.

Figure 3:
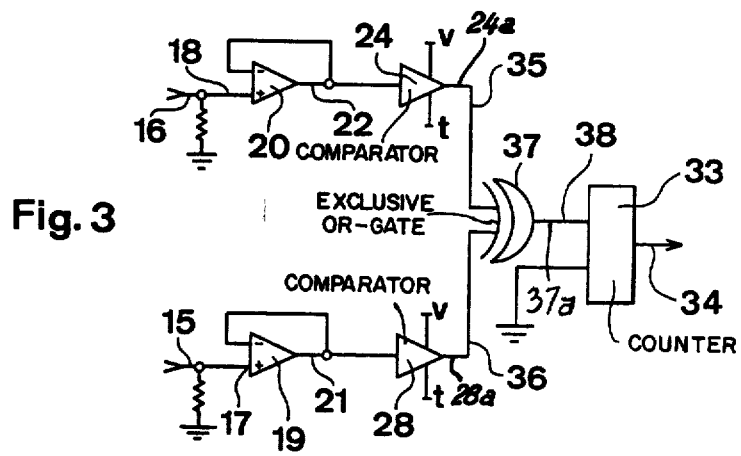
FIG. 3 is a block circuit diagram of a variant construction of monitoring apparatus employing an anticoincidence circuit or Exclusive OR-gate.

Such constructional embodiment has been illustrated in FIG. 3 wherein the comparators 24 and 28 which are adjustable with regard to the comparison voltage (V) and the return or resetting time ($t$), are directly connected with the forwardly arranged operational amplifiers 20 and 19 respectively. The outputs 24a and 28a of the comparators 24 and 28 respectively, are connected in this instance with the inputs 35 and 36 of an Exclusive-OR-gate 37, the output 37a of which is connected by means of the conductor 38 with the counter circuit 33.

The difference from the circuit of FIG. 1 essentially resides in the fact that as a rule each signal produced by the electrodes 12, 13 due to a ruptured piece of textile material moving therepast appears at the output 38, whereas on the other hand not signals simultaneously induced in the electrodes. A flock which moves past the electrodes can thus produce two signals at the output 38. Also in this case the presence of a finite transit time, i.e., the time displacement of the signals produced at the electrodes can be employed as the criterion for either taking into account or neglecting the signals which appear.

Figure 4:
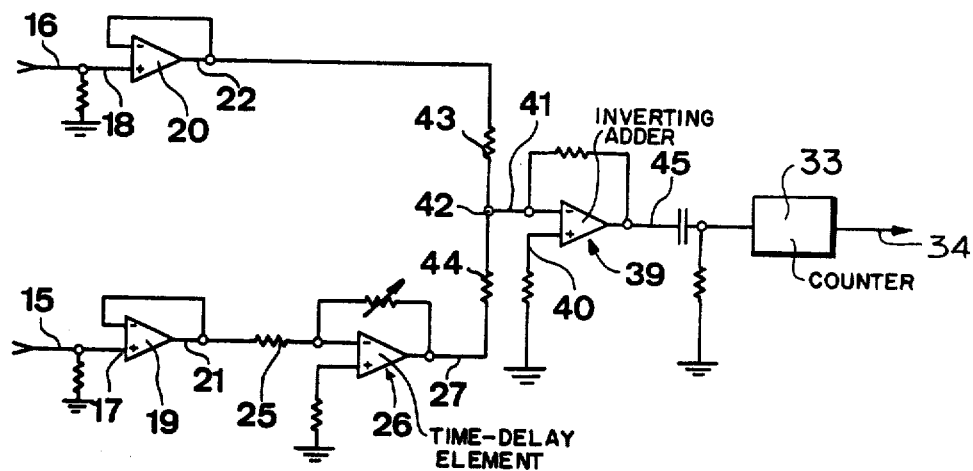
FIG. 4 is a block circuit diagram of a further embodiment of monitoring apparatus employing an inverting or reversing adder circuit.

In FIG. 4 there is employed, instead of the AND-gate 31 of FIG. 1, an inverting adder 39, the one input 40 of which is at a reference potential, whereas the other input 41 is connected with the junction point 42 between two series-connected resistors 43, 44 arranged between the output 22 of the operational amplifier 20 and the output 27 of the time-delay element 26. At the output 45 of the inverting adder 39 there again only then appears a signal when there are present at the conductors 15 and 16 signals which have been shifted in time by a predetermined finite duration.

Although with the heretofore described exemplary embodiments the actual occurrence of time-shifted signals at the electrodes 12 and 13 can be viewed as an indication of an "irregular operational condition," conversely, the proposed apparatus also can be used in those situations wherein the absence of time-shifted signals at the electrodes 12 and 13 indicates an "irregular operational condition." This is for instance possible when monitoring the spinning balloon of a spinning machine where the yarn carries out a revolving motion. In this case it is sufficient to arrange the electrodes in offset relationship in the direction of such revolving movement and to construct the counter circuit or counter 33, for instance as a backwards counter, in such a manner that only then will there be generated a signal at the output 34 if during a predetermined time duration there is not counted a given number of signals.

While there are shown and described present preferred embodiments of the invention, it is to be distinctly understood that the invention is not limited thereto, but may be otherwise variously embodied and practiced within the scope of the following claims.

Accordingly, what is claimed is:

1. A monitoring apparatus for monitoring irregular operation of a textile machine, comprising means for conveying textile material in a predetermined direction of movement, feeler means cooperating with said conveying means for sensing the presence of the textile material moving therepast, said feeler means comprising two single electrodes arranged in offset relationship from one another in the direction of movement of the textile material, each single electrode delivering an electrode signal when the textile material moves therepast, an evaluation circuit operatively connected with said feeler means, said evaluation circuit comprising logic circuitry responsive to said electrode signals having a time displacement at least approximately corresponding to the transit time of the textile material from one electrode to the other electrode.

2. The monitoring apparatus as defined in claim 1, wherein one of said two single electrodes constitutes a forward electrode with respect to the direction of movement of the textile material, said logic circuitry including a time-delay element coupled with said forward electrode.

3. The monitoring apparatus as defined in claim 2, wherein said time-delay element comprises a phase shifter.

4. The monitoring apparatus as defined in claim 3, wherein the phase shifter is adjustable in its time-delay as a function of the distance between the two single electrodes and the speed of movement of the textile material.

5. The monitoring apparatus as defined in claim 1, further including means for adjusting and fixing the distance between said two single electrodes.

6. The monitoring apparatus as defined in claim 2, wherein the other of said two single electrodes defines a rear electrode, said time-delay element having an output, said logic circuitry including an inverting adder-amplifier having an input, said rear electrode being connected in circuit with the output of the time-delay element and the input of said inverting adder-amplifier.

7. The monitoring apparatus as defined in claim 2, wherein the other of said single electrodes defines a rear electrode, said time-delay element having an output, said logic circuitry including a coincidence-circuit, the output of the time-delay element being connected in circuit with said coincidence-circuit.

8. The monitoring apparatus as defined in claim 7, wherein said coincidence-circuit comprises an AND-gate.

9. The monitoring apparatus as defined in claim 1, wherein said logic circuitry includes two pulse-shaping comparators, an Exclusive-OR-gate circuit coupled with said two comparators, each of said electrodes being connected via an associated one of said pulse-shaping comparators with said Exclusive-OR-gate circuit.

10. The monitoring apparatus as defined in claim 9, wherein said two pulse-shaping comparators are identically constructed.

11. The monitoring apparatus as defined in claim 1, wherein said evaluation circuit includes a respective impedance converter with each of which there is connected an associated one of said electrodes, and a respective pulse-shaping comparator connected in series with each impedance converter.

12. The monitoring apparatus as defined in claim 11, wherein said comparators each possessing a threshold value circuit with adjustable threshold value.

13. The monitoring apparatus as defined in claim 12, wherein each of the comparators comprises a monostable element having an adjustable reset time which determines the duration of the output signals of the comparators.

14. The monitoring apparatus as defined in claim 6, wherein the inverting adder-amplifier has connected thereafter an integration stage having a constant discharge characteristic.

15. The monitoring apparatus as defined in claim 8, wherein the AND-gate has connected thereafter an integration stage having constant discharge characteristic.

16. The monitoring apparatus as defined in claim 9, wherein the Exclusive-Or-gate circuit has connected thereafter an integration stage with constant discharge characteristic.

17. The monitoring apparatus as defined in claim 6, wherein the inverting adder-amplifier has connected thereafter a counting stage having preadjusted counting value and periodic resetting.

18. The monitoring apparatus as defined in claim 8, wherein the AND-gate has connected thereafter a counter stage having preadjusted counter value and periodic resetting.

19. The monitoring apparatus as defined in claim 9, wherein the Exclusive-OR-gate circuit has connected thereafter a counter stage having preadjusted counter values and periodic resetting.

* * * * *